United States Patent

Kitamura

[15] 3,648,087
[45] Mar. 7, 1972

[54] ELECTROMAGNETIC BRAKING DEVICE

[72] Inventor: Hiroyuki Kitamura, Yokohama, Japan

[73] Assignee: Tokyo Shibaura Electric Co., Ltd., Kawasaki, Japan

[22] Filed: July 22, 1970

[21] Appl. No.: 57,174

[52] U.S. Cl. ................................310/93, 310/64, 310/96
[51] Int. Cl. .......................................................H02k 49/04
[58] Field of Search..........................310/93, 64, 263, 105, 96

[56] References Cited

UNITED STATES PATENTS

| | | | |
|---|---|---|---|
| 1,989,139 | 1/1935 | Koch | 310/64 X |
| 2,367,163 | 1/1945 | Winther | 310/93 |
| 2,386,701 | 10/1945 | Martin | 310/93 |
| 3,178,598 | 4/1965 | Cohen et al. | 310/98 |
| 3,319,100 | 5/1967 | Erickson | 310/263 X |
| 3,541,410 | 11/1970 | Rothert | 310/263 X |

*Primary Examiner*—D. X. Sliney
*Attorney*—Oblon, Fisher & Spivak

[57] ABSTRACT

An electromagnetic braking device for absorbing the running energy of a vehicle and thereby reducing the speed thereof featuring a stator core secured to a stationary portion of the vehicle body, a rotary shaft extending through said stator core and being drivingly connected with the drive shaft of the vehicle, a comb-shaped poled rotor mounted on the rotary shaft for unitary rotation therewith within a bore of the stator core, and exciting coils for generating magnetic fluxes through the pole surfaces of the rotor and the inner surface of the stator core to cause eddy currents to flow on the inner surface of the stator core, whereby the speed of the rotor is retarded.

6 Claims, 2 Drawing Figures

ELECTROMAGNETIC BRAKING DEVICE

BACKGROUND OF THE INVENTION

This invention relates to a speed reduction apparatus and, more particularly, to an electromagnetic braking device for absorbing the running energy of an automotive vehicle and thereby reducing the speed thereof.

One of the problems faced by drivers of automotive vehicles in negotiating long downhill routes of relatively steep inclination, such as encountered in travelling down mountain roads, is that of retarding the speed of the vehicle normally being increased by the added inertial momentum thereof, without using the foot brake for such extended periods as to cause excessive wear and heating of the brake drums and brake linings. A common solution to this problem involves imparting an engine braking action, while simultaneously actuating the footbrake as necessary. Closing the throttle valve and thereby completely interrupting the supply of fuel to the engine is one form of engine braking, but with this practice, the temperature of the engine often is so reduced that restarting thereof, when the vehicle reaches the bottom of the hill, is often a difficult maneuver, even though fuel is again being supplied to the engine.

SUMMARY OF THE INVENTION

Accordingly, it is an object of the present invention to provide a speed-retarding apparatus for automotive vehicles which is auxiliary to the usual footbrake and effectively reduces the frequency of footbrake actuation required during the drive of the vehicle and thereby prevents excessive wear and heating of the brake drums and brake linings associated therewith.

Another object of the present invention is to provide a braking device for absorbing the running energy of an automotive vehicle which is auxiliary to the usual footbrake and is effective for reducing the frequency of footbrake actuation required during the drive of the vehicle, and thereby avoids fatigue of the drive and assures safety in the operation of the vehicle.

The foregoing and other objects are attained by an electromagnetic speed-retarding, or braking, device for absorbing the running energy of an automotive vehicle which comprises a stator core mounted in the vehicle frame, a comb-shaped pole-type magnetic rotor secured to and rotatably driven by the drive shaft of the vehicle and being positioned within a bore of the stator core, and exciting means positioned adjacent the rotor for generating magnetic fluxes between the pole surfaces thereof and the inner surface of the stator core to thereby set up an eddy current flow on the inner surface of the stator core which is opposite to the rotor for retarding the rotary motion thereof and thus operates to reduce the vehicle speed without having to rely on frequent use of the foot brake and other brake means.

BRIEF DESCRIPTION OF THE DRAWINGS

Various other objects, features and additional advantages of the present invention will be readily appreciated as the same becomes better understood from the following detailed description when considered in connection with the accompanying drawing, wherein like reference numerals are used to designate like or corresponding parts in the several Figures thereof, and in which.

DESCRIPTION OF THE ILLUSTRATED EMBODIMENTS

Figure 1:
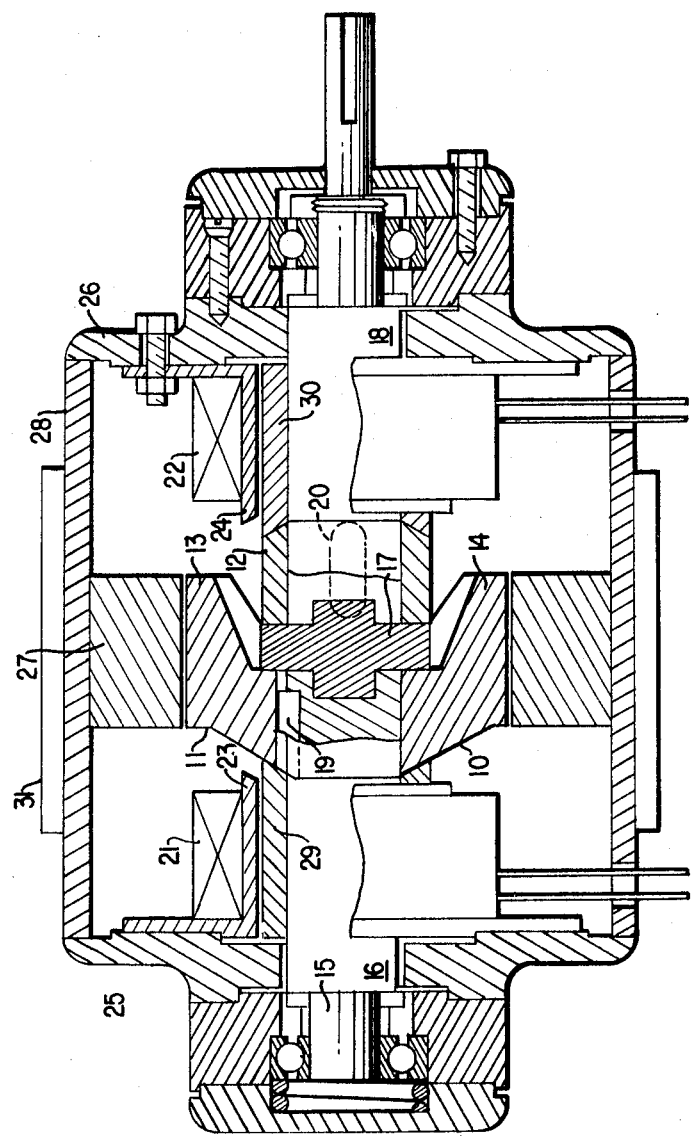
FIG. 1 is an axial front elevational view, partly in section, of an embodiment of the apparatus according to the invention; and, FIG. 2 is a similar axial sectional front elevational view of another embodiment constructed according to the present invention.

Referring now particularly to FIG. 1, the reference numeral 10 generally designates a rotor consisting of a pair of axially separated members 11 and 12, the one member 11 having axially extending teeth, or pole pieces, 13 and 14, and the other member 12 having a similar pair of axially extending teeth or pole pieces, not shown, which are positioned between the pole pieces 13 and 14 and are engaged therewith.

A rotary shaft carrying thereon the rotor members 11 and 12 preferably comprises three separate components 16, 17 and 18, which are mechanically connected by shrink fit and welding processes, and is rotatably journaled in bearings supported in the frame, or body, of an automotive vehicle. The intermediate component 17 of the shaft 15, which axially separates the members 11 and 12 of the rotor 10, is preferably made of nonmagnetic steel. Both the members 11 and 12 are fixed on the shaft 15 by keys 19 and 20, respectively, for rotation therewith. Although not shown, it is understood that wedges constructed of nonmagnetic material may be inserted between the circumferentially disposed, adjacent pole pieces, being welded thereto for moving with the same during rotation of the shaft 15 and rotor 10.

Excitement of the comb-shaped rotor 10 is provided by DC exciting coils 21 and 22 wound, respectively, on spools 23 and 24 which are attached through circular flanges thereon by bolts or the like to the inner sidewalls of suitable end brackets 25 and 26, so that the coils are positioned around the opposite end portions of the shaft 15, or about the component parts 16 and 18 thereof.

The magnetic poles 13 and 14 of the members 11 and 12 of rotor 10 are rotatably positioned within the bore of a stator core member 27, the outer surface of which is fitted into the inner surface of an outer frame member 28 for attaining good heat conductivity therebetween.

To successfully conduct magnetic fluxes being emanated from the coils 21 and 22, there are provided sleeves 29 and 30 of magnetic material which are mounted around the opposite end portions of the shaft 15, or about the end components 16 and 18 thereof. The axially disposed inner ends of the sleeves 29 and 30 are magnetically abutted against the axially disposed outer ends of boss portions of the pole-supporting components 16 and 18, respectively, of the rotor.

In operation of the coupling described hereinabove, when the field coils 21 and 22 are simultaneously excited and the shaft 15 is driven by a propeller shaft of an automotive vehicle engine, magnetic fluxes will be emanated and, in the case of the coil 21, the magnetic flux will pass through a path which serially includes the spool 23, sleeve member 29, member 11 of the rotor 10, the teeth or poles 13 and 14 of the member 11, an airgap existing between the exterior surfaces of the poles 13 and 14 and the inner surface of the stator core 27, stator core 27, frame 28, and the end bracket 25. Similarly, in the case of the coil 22, the magnetic flux emanating therefrom passes through a magnetic path which serially includes spool 24, sleeve 30, the other member 12 of rotor 10, the poles of the member 12 which correspond to poles 13 and 14 of member 11, an air gap between the surfaces of these poles and the inner surface of stator core 27, frame 28 and the end bracket 26. The flux concentrations entering and leaving the smoothed inner surface of the stator core 27 produces eddy currents therein and the interaction between the generated eddy currents and the magnetic poles of the pole members 11 and 12 produces a braking torque on the pole members and hence upon the output shaft 15, thereby suppressing the speed of the vehicle engine.

In this process, considerable heating of the inner surface of the stator core occurs due to the eddy currents flowing therein. To diffuse the heat emanating from the stator core 27 during the operation of the retarder, a plurality of cooling fins 31 are provided on the outer surface of the frame member 28. Because of the closed thermal contact between the outer surface of the stator core 27 and the inner surface of the frame member 28, the heat generated in the stator core by the eddy current flow is effectively diffused through the fins 31 to the atmosphere.

Figure 2:
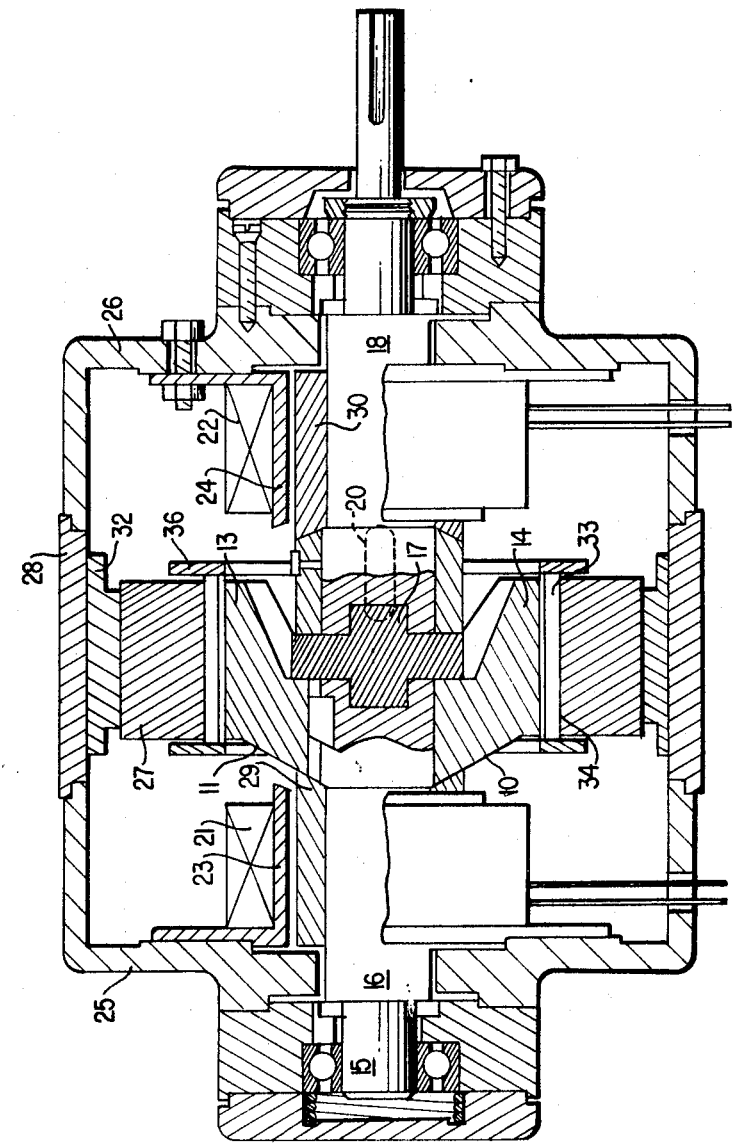

Referring now particularly to FIG. 2, wherein a modification of the electromagnetic braking device constructed according to this invention is shown, the stator core 27 is fitted within the frame member 28, being disposed in contacting relation in a cylindrical member 32 of nonmagnetic material engaging the inner surface of the frame 28, which serves to interrupt the magnetic path between the stator core 27 and the frame 28. In this case, the magnetic flux path may be traced from the spool 23 through the end bracket 25, frame 28, end bracket 26, spool 24, sleeve member 30, the member 12 of comb-shaped rotor 10, the poles of the member 12, stator core 27, the poles 13 and 14 of the other member 11 of rotor 10, sleeve member 29 and back to the spool 23.

For the purpose of enhancing the flow of eddy currents, short circuiting bars 33 are provided within slots 34 which are cut on an inner surface of the stator core 27 and axially extended. The opposite ends of the short circuiting bars 33 are connected together with short circuit rings 35 and 36 spaced apart and adjacent opposite edges of the stator core 27 and thereby forming a stationary squirrel cage.

Although not shown, it is understood that the leads from the coils 21 and 22 are brought out to suitable terminals on the machine housing and are electrically connected as to provide proper direction of current flow therethrough.

With the present invention, an electromagnetic braking device capable of operation at high speeds is provided which, because of the comb-shaped pole-type rotor which does not include the exciting coils therewithin, may be made in a compact size. Also, the heat generated in the stator core due to the flowing of eddy currents is effectively diffused from the stator core to the atmosphere through the closed heat conductive contact areas between the stator core and the frame. Alternatively, as shown in FIG. 2, this may be achieved by conducting the heat through a nonmagnetic cylindrical member, or spacer 32. In this sense, too, because of the good heat diffusion provided, further reduction of the size of the retarder is possible.

Further, the braking device according to the present invention may assume a large cross section along the magnetic flux path, and therefore a large brake torque may be obtained easily since eddy currents having higher amplitude in the stator or short circuit bars may be cause to flow therein.

Obviously, many modifications and variations of the present invention are possible in light of the above teachings. It is to be understood, therefore, that within the scope of the appended claims, the present invention may be practiced otherwise than as specifically described herein. Accordingly,

What is claimed and desired to be secured by Letters Patent is:

1. In combination with an automotive vehicle, an electromagnetic speed retarding device comprising:
 a frame adapted to be secured to a stationary portion of the vehicle,
 a stator core positioned in said frame in close relation with the inner surface thereof for permitting the diffusion of heat generated therein through the frame to the ambient atmosphere, said core having a central bore therein,
 a comb-shaped pole-type rotor adapted to be connected to the drive shaft of the vehicle being rotatably mounted in said bore of said stator core and having an axial extension lying outside bore, and
 DC exciting means mounted around said axial extension of said rotor for generating the flow of magnetic fluxes through a radial airgap between the pole surfaces of the rotor and the inner surface of the stator core, thereby causing eddy currents to flow on the inner surface of the stator core during rotation of the rotor and upon excitation of the exciting means.

2. An electromagnetic retarding device according to claim 1, wherein said stator core has a plurality of axially cut slots on the inner surface thereof, and further comprising at least one short circuiting bar of a stationary squirrel cage disposed in at least one of said slots.

3. An electromagnetic speed reduction device for automotive vehicles comprising:
 a frame adapted to be secured to a stationary portion of the vehicle,
 a rotary shaft extending through said frame for being connected with the drive shaft of the vehicle,
 a stator core positioned in said frame in contacting relation with the inner surface thereof, said core having an axial bore through which said rotary shaft is received,
 a rotor comprising a pair of axially separated members having opposed axially extending poles mounted on said rotary shaft for rotation therewith and being positioned in said bore of said stator core, thereby forming a small annular airgap between the outer surface of said rotor and the inner surface of said stator core,
 exciting means mounted in said frame for generating magnetic flux flow through said radial airgap for causing eddy currents to flow on the inner surface of said stator core during rotation of said rotor,
 magnetic sleeve members on said rotary shaft on both sides of said rotor, said sleeve members being in contacting relation with said rotary shaft and with said rotary members, and
 said rotary shaft comprising a pair of axially spaced shaft components each being in contacting relation with one of said sleeve members, and an intermediate component being of nonmagnetic material, the three shaft components being connected for unitary rotation.

4. An electromagnetic speed reduction apparatus according to claim 3, wherein said exciting means comprises an exciting coil disposed about each of said sleeve members.

5. An electromagnetic speed reducing apparatus according to claim 4, further including a plurality of cooling fins disposed on the outside wall of said frame for permitting heat generated in the frame to be diffused to the ambient atmosphere.

6. An electromagnetic speed reducing apparatus according to claim 4, wherein said stator core includes a plurality of axially cut slots on the inner surface thereof,
 a short circuiting bar of a stationary squirrel cage positioned in each of said slots in said stator core, and,
 a nonmagnetic cylindrical spacing sleeve positioned between the outer surface of said stator core and the inside surface of said frame for diffusing the heat from the stator core to the atmosphere.

* * * * *